United States Patent [19]

Duda

[11] 4,262,955
[45] Apr. 21, 1981

[54] STORAGE PARTITION

[76] Inventor: Henry J. Duda, 3357 North Newland Ave., Chicago, Ill. 60634

[21] Appl. No.: 19,874

[22] Filed: Mar. 12, 1979

[51] Int. Cl.³ .............................................. B60P 3/05
[52] U.S. Cl. ................................. 296/24 R; 296/37.16
[58] Field of Search ................. 296/24 R, 37.16, 100; 160/264

[56] References Cited

U.S. PATENT DOCUMENTS 3,292,685  12/1966  Clark ...................................... 160/264
3,891,263   6/1975  Orsulak ................................ 296/24 R
4,127,301  11/1978  Syrowik ............................... 296/37.16

Primary Examiner—John J. Love
Assistant Examiner—John A. Carroll
Attorney, Agent, or Firm—Vogel, Dithmar, Stotland, Stratman & Levy

[57] ABSTRACT

A storage partition for a motor vehicle and particularly a station wagon which provides a compartment for storing material that is hidden from view from the casual onlooker, thereby to permit storage of valuable articles in an unattended vehicle while reducing the chance of the vehicle being broken into and the articles stolen.

9 Claims, 5 Drawing Figures

U.S. Patent  Apr. 21, 1981  4,262,955
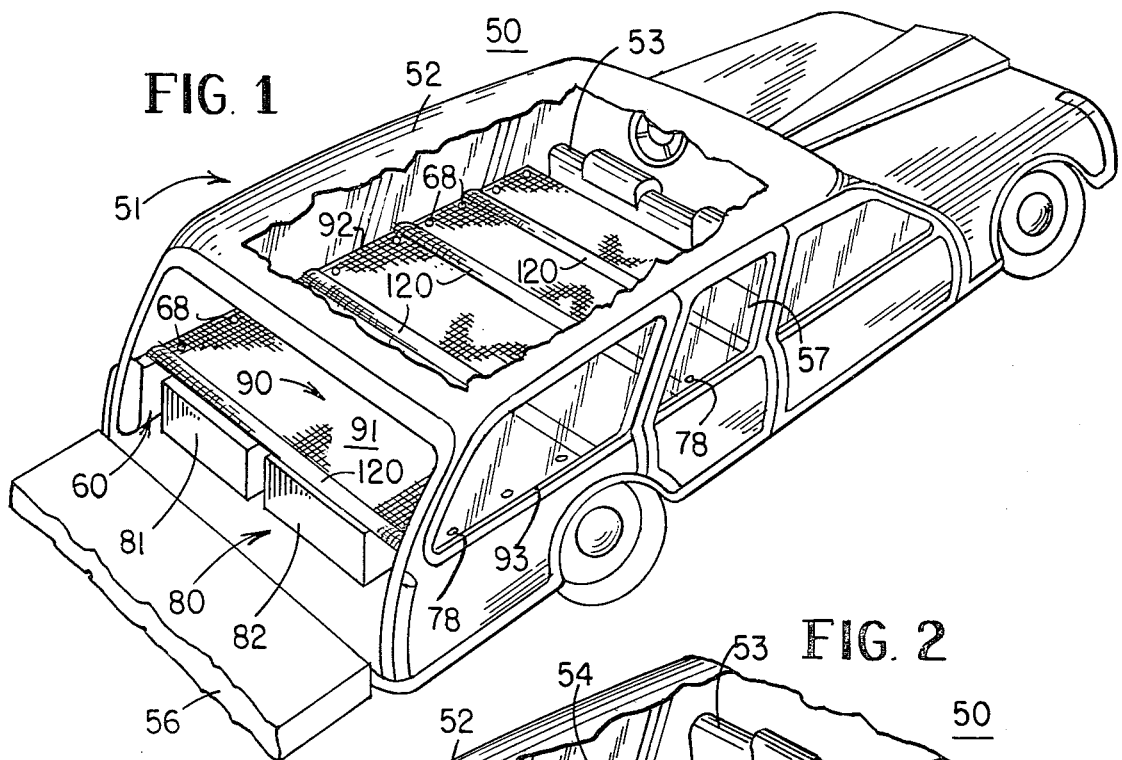
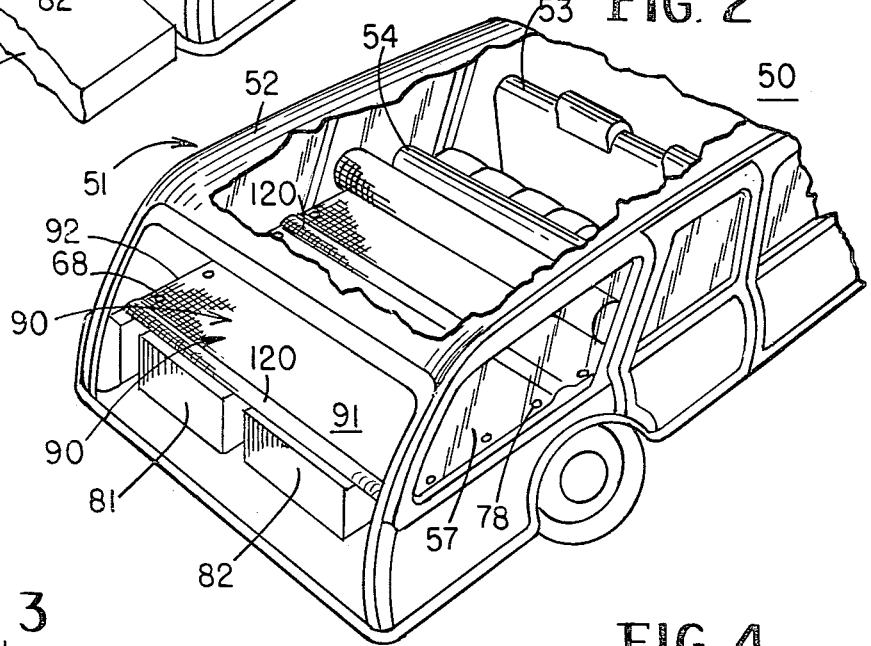
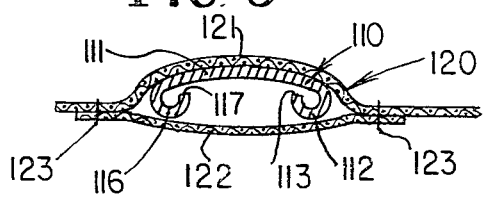
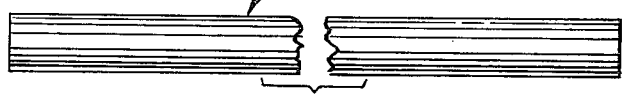
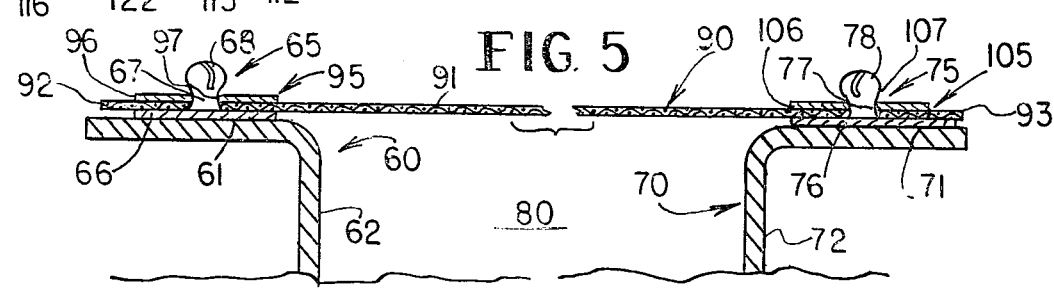

STORAGE PARTITION

BACKGROUND OF THE INVENTION

Many station wagons, vans and the like are unsafe for their storage capability, but one significant problem with vehicles of this type is that the material stored in the vehicle is readily seen by passersby. Particularly in a station wagon-type vehicle, the material in the rear of the vehicle is readily seen by anyone who cares to look in the window. It is common knowledge that station wagons are often used for deliveries by small business and the like, and pilferage is rampant in large cities where delivery men often fail to lock the doors of the station wagon or are absent from the vehicle for an extended period of time, thereby permitting unauthorized entry into the vehicle.

An obvious method of hiding the material in the vehicle from ordinary view is to blacken or otherwise darken the windows, but this is generally unsatisfactory when the station wagon is also used as a family vehicle. Curtains or the like are another alternative, but they too present problems when the vehicle is used as a family vehicle, and therefore, do not present the answer to the posed problem.

SUMMARY OF THE INVENTION

This invention relates to a storage partition for a motor vehicle, and more particularly to a storage partition which is adjustable longitudinally of the vehicle, thereby to accommodate storage compartments of varying lengths.

An important object of the present invention is to provide a storage partition for a motor vehicle comprising an elongated flexible and opaque material, longitudinally spaced apart brace means extending transversely of the material, and fastening means on both the longitudinally extending side edges of the flexible material for connection to complementary fastening means on the motor vehicle.

Another object of the present invention is to provide a storage partition of the type set forth wherein the brace means are a plurality of longitudinally spaced apart transversely extending convex shaped bars housed in individual pockets in the flexible material.

Another object of the present invention is to provide a partition means of the type set forth which is easily foldable or capable of being rolled rearwardly to accommodate storage compartments of varying lengths.

These and other objects of the present invention will be more readily understood by reference to the following specification read in conjunction with the accompanying drawings, in which:

BRIEF DESCRIPTION OF THE DRAWINGS

FIG. 1 is a perspective view of a station wagon with the roof partially broken away and the tail gate in the down or open position showing the partition of the present invention;

FIG. 2 is a view of the rearmost section of the station wagon illustrated in FIG. 1 with the roof broken away and the partition partly rolled up and the back seat of the station wagon in the raised position;

FIG. 3 is an enlarged sectional view of the brace means and the pocket therefor;

FIG. 4 is a top elevational view of the brace means illustrated in FIG. 3; and

FIG. 5 is an enlarged sectional view of the station wagon floor sills and the partition and the connection means therefor.

DETAILED DESCRIPTION OF THE PREFERRED EMBODIMENT

Referring now to the drawings, there is disclosed a station wagon 50 of the usual type having a body 51 including a roof 52 which is partially broken away. There is a front seat 53 and a fold-down rear seat 54, the rear seat 54 being folded down into the storage position in FIG. 1 and being raised into the seating position in FIG. 2. The usual tail gate 56 is shown in the folded or open position in the drawings, and of course, the station wagon 50 is provided with the usual accompaniment of windows 57.

Interiorly of the station wagon 50 are spaced apart longitudinally extending floor sills 60 and 70. As seen particularly in FIG. 5, the floor sill 60 has a horizontal surface 61 and a vertical surface 62 integral therewith, the horizontal surface 61 being provided with longitudinally spaced apart fasteners 65. Each of the fasteners includes a base plate 66 fixedly secured to the horizontal surface 61 and an upstanding post 67 having an enlarged head 68. Similarly, the floor sill 70 is provided with a horizontally extending surface 71 and a vertically extending surface 72 integral therewith. The floor sills 60 and 70 both extend substantially the entire longitudinal length of the station wagon 50 from adjacent the tail gate 56 to adjacent the rear of the front seat 53. Longitudinally spaced apart and extending the entire length of the floor sill 70 are fasteners 75 each of which includes a flat base 76 fixed to the horizontal surface 71 and an upstanding post 77 having an enlarged head 78.

Intermediate the two floor sills 60 and 70, and more particularly intermediate the vertical portions 62 and 72, respectively, there is defined a storage area 80 into which various packages, such as those illustrated at 81 and 82 in FIGS. 1 and 2 are positioned. Normally, an onlooker can see the nature of the packages 81 and 82 in the storage space 80 by looking into the various windows 57 of the station wagon 50. In order to hide the packages 81 and 82 being transported in the station wagon 50 there is provided a partition 90.

The partition 90 includes a body portion 91 which may be fabricated of a cloth such as canvas or cotton poplin or the like, or may be fabricated from a synthetic organic resin which is opaque such as a colored polyethylene or polypropylene or other suitable plastic material. The partition 90, and more particularly the body portion 91 thereof, has transversely spaced apart longitudinally extending edges 92 and 93. The edge 92 is provided with longitudinally spaced apart fasteners 95 positioned to be in registry with the corresponding ones of the fasteners 65 on the floor sill 60. Each of the fasteners 95 includes a disk portion 96 which is reinforcingly adhered to the body 91 along the side edge 92 and has an aperture 97 therein which may be spring loaded (not shown). Each of the fasteners 95 is adapted to snap fit over the enlarged head 68 of the corresponding fastener 65, thereby to provide secure relationship between the row of fasteners 65 and the partition 90 and particularly the fasteners 95 thereon. Similarly, there is a row of fasteners 105 along the edge 93 of the partition 90. Each of the fasteners 105 is provided with a base disk 106 reinforcingly adhered to the body 91 along the edge 93 thereof in registry with a respective one of the fasteners 75. Each of the fasteners 105 has an aperture 107 therethrough which may be spring loaded (not shown). Again, each of the fasteners 105 is in registry with a corresponding one of the fasteners 75, thereby to permit securement of the partition 90 to the floor sill 70 longitudinally of the station wagon 50.

Longitudinally spaced apart along the length of the partition 90 are a plurality of braces 110. Each brace 110 is an aluminum bar having a convexly curved portion 111 with an incurved flange 112 at one end thereof and an incurved flange 116 at the other end thereof. The incurved flange 112 is part-circular and has an end 113 terminating adjacent the lower surface of the convexly shaped portion 111. Similarly, the incurved and part circular flange 116 has an end 117 thereof which terminates near the undersurface of the convexly shaped portion 111. The configuration of the brace 110 is such that it adds strength and maintains the partition body 91 taut. Braces 110 each extend substantially from the floor sill 60 to the floor sill 70 and are sized to slide easily within each of the individual pockets 120 which house the braces 110. Each of the pockets 120 includes a top portion 121 which is actually formed of the top surface of the partition body 91, and an underflap 122 which is sewn at each of two seams 123 extending transversely across the entire width of the partition body 91. Preferably, one of the braces 110 is adjacent the rearmost end of the station wagon to provide support thereat and to prevent the partition 91 from being ripped or otherwise torn during loading and unloading of the packages 81 and 82 into the compartment 80.

As seen from the drawings, the partition 90 is easily adjustable for varying lengths of the storage compartment 80. FIG. 1 illustrates the entire unfolded length of the partition 90 which extends from adjacent the tail gate 56 to adjacent the rear of the front seat 53. FIG. 2 illustrates the easy adjustability of the length of the partition 90 by rolling the partition 90 rearwardly from the front seat 53 to a position slightly behind the rear seat 54, thereby to accommodate a shortened storage area 80 when the rear seat 54 is used to transport passengers. Strategic location of the fasteners 65 and 75 such that one each is located adjacent the rear seat 54 when the seat is in the upward or raised position insures that the partition 90 will function adequately in the position illustrated in FIG. 2 without any chance that the partition might roll back inadvertently during transportation, thereby exposing the material stored within the area 80.

While there has been described what at present is considered to be the preferred embodiment of the present invention, it will be understood that various modifications and alterations may be made therein without departing from the true spirit and scope of the present invention, and it is intended to cover in the appended claims all such variations and modifications thereof.

What is claimed is:

1. A storage partition for a motor vehicle, comprising an elongated flexible and opaque material, longitudinally spaced apart brace means extending transversely of said material, said brace being a metal bar convex in transverse cross section having the longitudinal ends thereof incurved forming two inwardly facing flanges, and fastening means on both of the longitudinally extending side edges of said flexible material for connection to complementary fastening means on the motor vehicle.

2. The partition of claim 1, wherein said brace means are maintained in transversely extending pockets in said material.

3. The partition of claim 1, wherein brace means extends from side edge to side edge of said material.

4. The partition of claim 1, wherein said brace is convex in transverse cross section.

5. The partition of claim 1, wherein at least one end of said partition has a brace extending thereacross.

6. The partition of claim 1, wherein said flexible material is cloth.

7. The partition of claim 1, wherein said flexible material is a synthetic organic resin.

8. The partition of claim 1, wherein said brace is aluminum.

9. A storage partition for a motor vehicle, comprising an elongated flexible and opaque material, longitudinally spaced apart brace means extending transversely of said material, said brace being a metal bar convex in transverse cross section having the longitudinal ends thereof incurved forming two inwardly facing flanges part circular in transverse cross section and fastening means on both of the longitudinally extending side edges of said flexible material for connection to complementary fastening means on the motor vehicle.

* * * * *